US009781045B2

(12) United States Patent
Chun et al.

(10) Patent No.: US 9,781,045 B2
(45) Date of Patent: *Oct. 3, 2017

(54) METHOD AND APPARATUS FOR PROVIDING MULTIMEDIA BROADCAST AND MULTICAST SERVICE (MBMS) IN WIRELESS COMMUNICATION SYSTEM

(71) Applicant: LG Electronics Inc., Seoul (KR)

(72) Inventors: Sungduck Chun, Anyang-si (KR); Sunghoon Jung, Anyang-si (KR); Seungjune Yi, Anyang-si (KR); Youngdae Lee, Anyang-si (KR); Sungjun Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/961,677

(22) Filed: Dec. 7, 2015

(65) Prior Publication Data

US 2016/0087904 A1 Mar. 24, 2016

Related U.S. Application Data

(63) Continuation of application No. 14/540,812, filed on Nov. 13, 2014, now Pat. No. 9,232,360, which is a
(Continued)

(51) Int. Cl.
*H04H 20/71* (2008.01)
*H04L 12/851* (2013.01)
(Continued)

(52) U.S. Cl.
CPC ............ *H04L 47/24* (2013.01); *H04L 12/189* (2013.01); *H04L 47/741* (2013.01); *H04W 4/06* (2013.01);
(Continued)

(58) Field of Classification Search
CPC ..... H04L 47/24; H04L 47/741; H04L 12/189; H04W 72/0413; H04W 4/06; H04W 72/005
See application file for complete search history.

(56) References Cited

U.S. PATENT DOCUMENTS 8,712,414 B2 * 4/2014 Somasundaram ..... H04W 36/0055
370/331
8,867,426 B2 10/2014 Chun et al.
(Continued)

FOREIGN PATENT DOCUMENTS

CN 1836387 A 9/2006
CN 1943138 A 4/2007
(Continued)

OTHER PUBLICATIONS

Catt, "MBMS Service Continuity for RRC-Connected Mode," 3GPP TSG RAN WG2 Meeting #75, R2-113825, Athens, Greece, Aug. 22-26, 2011, pp. 1-3.
(Continued)

*Primary Examiner* — Clemence Han
(74) *Attorney, Agent, or Firm* — Birch, Stewart, Kolasch & Birch, LLP

(57) ABSTRACT

A method for receiving a multimedia broadcast multicast service (MBMS) by a user equipment (UE) in a wireless communication system; the UE therefore; a method for transmitting an MBMS by a base station (BS) in a wireless communication system; and the BS therefore are discussed. The method for receiving an MBMS by a UE according to one embodiment includes transmitting one or more system information blocks (SIBs); receiving a first MBMS interest indication message indicating whether MBMS reception is prioritized above unicast reception, when a predetermined SIB related to MBMS service continuity is included in the one or more SIBs; and receiving a second MBMS interest
(Continued)

indication message according to a change of priority between the MBMS reception and the unicast reception.

14 Claims, 9 Drawing Sheets

Related U.S. Application Data continuation of application No. 14/480,320, filed on Sep. 8, 2014, now Pat. No. 9,241,244, which is a continuation of application No. 13/808,872, filed as application No. PCT/KR2012/006990 on Aug. 31, 2012, now Pat. No. 8,867,426.

(60) Provisional application No. 61/530,375, filed on Sep. 1, 2011, provisional application No. 61/537,027, filed on Sep. 20, 2011, provisional application No. 61/541,101, filed on Sep. 30, 2011, provisional application No. 61/555,487, filed on Nov. 4, 2011, provisional application No. 61/592,000, filed on Jan. 30, 2012.

(51) Int. Cl.
*H04W 72/00* (2009.01)
*H04W 4/06* (2009.01)
*H04L 12/18* (2006.01)
*H04L 12/911* (2013.01)
*H04W 72/04* (2009.01)

(52) U.S. Cl.
CPC ..... *H04W 72/005* (2013.01); *H04W 72/0413* (2013.01)

(56) References Cited

U.S. PATENT DOCUMENTS

| | | |
|---|---|---|
| 2004/0008646 A1 | 1/2004 | Park et al. |
| 2010/0061285 A1* | 3/2010 | Maeda ............... H04W 4/06 370/312 |
| 2010/0197265 A1 | 8/2010 | Dorenbosch et al. |
| 2011/0149827 A1 | 6/2011 | Na et al. |
| 2011/0194477 A1 | 8/2011 | Damnjanovic et al. |
| 2011/0205952 A1 | 8/2011 | Gou et al. |
| 2011/0235565 A1 | 9/2011 | Wu |
| 2011/0292860 A1 | 12/2011 | Yang et al. |
| 2011/0305183 A1 | 12/2011 | Hsu et al. |
| 2012/0026929 A1 | 2/2012 | Wang et al. |
| 2012/0213130 A1 | 8/2012 | Zhang et al. |
| 2012/0236776 A1 | 9/2012 | Zhang et al. |
| 2012/0275369 A1* | 11/2012 | Zhang ............... H04W 76/002 370/312 |
| 2013/0039248 A1 | 2/2013 | Koskinen et al. |
| 2013/0039250 A1* | 2/2013 | Hsu ............... H04H 20/71 370/312 |
| 2013/0044668 A1 | 2/2013 | Purnadi et al. |
| 2013/0064162 A1 | 3/2013 | Phan et al. |
| 2013/0107790 A1 | 5/2013 | Lee et al. |
| 2014/0044035 A1 | 2/2014 | Hwang et al. |
| 2014/0211685 A1* | 7/2014 | Kim ............... H04W 36/06 370/312 |
| 2014/0355507 A1* | 12/2014 | Amerga ............... H04W 4/08 370/312 |

FOREIGN PATENT DOCUMENTS

| | | |
|---|---|---|
| EP | 1509056 A2 | 2/2005 |
| WO | WO 2012/115726 A1 | 8/2012 |

OTHER PUBLICATIONS

LG Electronics, Inc., "MBMS service continuity in connected mode," 3GPP TSG-RAN WG2 #75, R2-114462, Athens, Greece, Aug. 22-26, 2011, pp. 1-3.
Nokia Siemens Networks et al., "MBMS Service Continuity and the UEs in RRC Connected," 3GPP TSG RAN WG2 #75, R2-114450, Athens, Greece, Aug. 22-26, 2011, 3 pages.
Samsung, "MBMS enhancements for REL-11, Connected,"3GPP TSG-RAN2 Meeting #75, R2-114222, Athens, Greece, Aug. 22-26, 2011, 4 pages.
Samsung, "MBMS enhancements for REL-11, General," 3GPP TSG-RAN2 Meeting #75, R2-114220 Athens, Greece, Aug. 22-26, 2011, 3 pages.
Alcatel-Lucent, "Congestion control on unicast traffic while receiving MBMS," 3GPP TSG-RAN WG2 Meeting #75, Aug. 22-26, 2011, Athens, Greece, R2-114282, pp. 1-4, XP050539736.

* cited by examiner

METHOD AND APPARATUS FOR PROVIDING MULTIMEDIA BROADCAST AND MULTICAST SERVICE (MBMS) IN WIRELESS COMMUNICATION SYSTEM

CROSS-REFERENCE TO RELATED APPLICATIONS

This application is a continuation of U.S. patent application Ser. No. 14/540,812 filed on Nov. 13, 2014, which is a continuation of U.S. patent application Ser. No. 14/480,320 filed on Sep. 8, 2014, which is a continuation of U.S. patent application Ser. No. 13/808,872 filed on Jan. 7, 2013 (now U.S. Pat. No. 8,867,426, issued on Oct. 21, 2014), which is the National Phase of PCT/KR2012/006990 filed on Aug. 31, 2012, which claims priority under 35 U.S.C. 119(e) to U.S. Provisional Application No. 61/530,375 filed on Sep. 1, 2011; U.S. Provisional Application No. 61/537,027 filed on Sep. 20, 2011; U.S. Provisional Application No. 61/541,101 filed on Sep. 30, 2011; U.S. Provisional Application No. 61/555,487 filed on Nov. 4, 2011 and U.S. Provisional Application No. 61/592,000 filed on Jan. 30, 2012. The entire contents of all of the above applications are hereby incorporated by reference.

BACKGROUND OF THE INVENTION

Field of the Invention

The present invention relates to a wireless communication system, and more particularly to a method and apparatus for providing a multimedia broadcast and multicast service (MBMS).

Discussion of the Related Art

A multimedia broadcast and multicast service (MBMS) can allow a single transmitter to simultaneously transmit the same multimedia content to a plurality of receivers using only one transmission action.

If the receiver desires to receive the MBMS, information indicating such interest can be transmitted to the transmitter, and the transmitter can enable the receiver to shift to a frequency at which the receiver receives the MBMS, and at the same time can provide the MBMS.

SUMMARY OF THE INVENTION

One eNode B supporting the MBMS may coexist with another eNode B not supporting the MBMS. If a user equipment (UE) transmits a message indicating the MBMS interest to the eNode B not supporting the MBMS, a faulty operation of the corresponding eNode B may occur. However, since the existing wireless communication system has been defined only to transmit a message indicating the MBMS interest, there is a need to develop and define a new method for preventing the occurrence of the above-mentioned faulty operation.

An object of the present invention is to provide a method and apparatus for enabling a user equipment (UE) to transmit an MBMS interest indication message under the control of an eNode B, and preventing not only the faulty operation of the eNode B but also a waste of radio resources.

It will be appreciated by persons skilled in the art that the objects that can be achieved through the present invention are not limited to what has been particularly described hereinabove and the above and other objects that the present invention can achieve will be more clearly understood from the following detailed description taken in conjunction with the accompanying drawings.

The object of the present invention can be achieved by providing a method for receiving a multimedia broadcast and multicast service (MBMS) by a user equipment (UE) in a wireless communication system, the method including: obtaining a predetermined system information block (SIB) from a base station (BS); and transmitting an MBMS interest indication message to the base station (BS) only when the predetermined system information block (SIB) is obtained, wherein the predetermined system information block (SIB) includes information related to MBMS continuity.

In another aspect of the present invention, a method for providing a multimedia broadcast and multicast service (MBMS) by a base station (BS) in a wireless communication system includes: broadcasting a predetermined system information block (SIB); and receiving an MBMS interest indication message from the user equipment (UE), wherein the MBMS interest indication message is transmitted from the UE only when the UE obtains the predetermined system information block (SIB), and the predetermined system information block (SIB) includes information related to MBMS continuity.

In another aspect of the present invention, a user equipment (UE) for receiving a multimedia broadcast and multicast service (MBMS) in a wireless communication system includes: a reception module for receiving a downlink signal from a base station (BS); a transmission module for transmitting an uplink signal to the base station (BS); and a processor for controlling the user equipment (UE) including the reception module and the transmission module, wherein the processor enables the reception module to obtain a predetermined system information block (SIB) from a base station (BS), and enables the transmission module to transmit an MBMS interest indication message to the base station (BS) only when the predetermined system information block (SIB) is obtained, and the predetermined system information block (SIB) includes information related to MBMS continuity.

In another aspect of the present invention, a base station (BS) for providing a multimedia broadcast and multicast service (MBMS) in a wireless communication system includes a reception module for receiving an uplink signal from a user equipment (UE); a transmission module for transmitting a downlink signal to the user equipment (UE); and a processor for controlling the base station (BS) including the reception module and the transmission module, wherein the processor enables the transmission module to broadcast a predetermined system information block (SIB), and enables the reception module to receive an MBMS interest indication message from the user equipment (UE), wherein the MBMS interest indication message is transmitted from the UE only when the UE obtains the predetermined system information block (SIB), and the predetermined system information block (SIB) includes information related to MBMS continuity.

The following contents can be commonly applied to the above-mentioned embodiments.

The MBMS interest indication message may be used to indicate whether the UE is receiving the MBMS or is going to receive the MBMS.

The MBMS interest indication message may further include information regarding an MBMS frequency at which the MBMS currently received by the UE or desired to be received by the UE is transmitted.

The MBMS interest indication message may further include MBMS priority information.

The MBMS priority information may indicate whether the MBMS has priority over a unicast service.

If the UE is handed over from a source cell to a target cell, the MBMS interest indication message may be transmitted to the target cell after completion of the handover.

The predetermined system information block (SIB) may be broadcast by the base station (BS).

The UE may be in a radio resource control (RRC) connection state.

The UE may be configured to simultaneously receive the MBMS and a unicast service.

It is to be understood that both the foregoing general description and the following detailed description of the present invention are exemplary and explanatory and are intended to provide further explanation of the invention as claimed.

Exemplary embodiments of the present invention have the following effects. The embodiments of the present invention can enable a user equipment (UE) to transmit an MBMS interest indication message under the control of an eNode B, thereby preventing the faulty operation of the eNode B and a waste of radio resources.

It will be appreciated by persons skilled in the art that the effects that can be achieved through the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention.

DETAILED DESCRIPTION OF THE INVENTION

Figure 1:
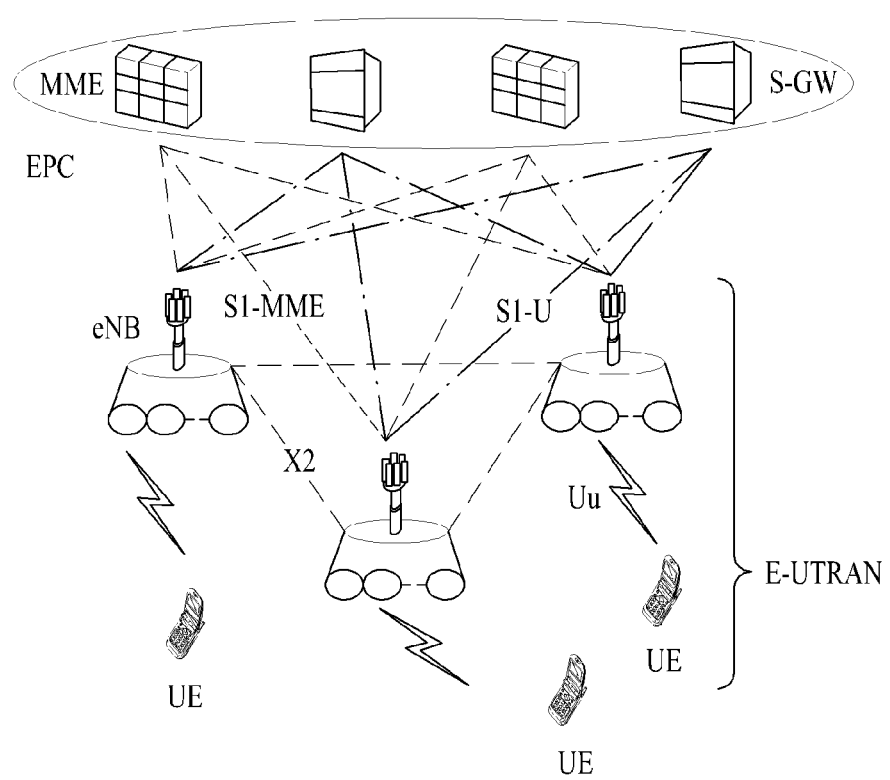
FIG. 1 is a diagram illustrating the architecture of a wireless communication system.

The following embodiments are proposed by combining constituent components and characteristics of the present invention according to a predetermined format. The individual constituent components or characteristics should be considered to optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with a Relay Node (RN) or a Relay Station (RS). The term "terminal" may also be replaced with the terms User Equipment (UE), Mobile Station (MS), Mobile Subscriber Station (MSS) or Subscriber Station (SS) as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, an LTE-Advanced (LTE-A) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communications)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of UMTS (Universal Mobile Telecommunications System). 3GPP (3rd Generation Partnership Project) LTE (long term evolution)

is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on 3GPP LTE and 3GPP LTE-A systems. However, technical features of the present invention are not limited thereto.

LTE System Structure

The architecture of an LTE system, which is an example of a wireless communication system to which the present invention is applicable, is described with reference to FIG. 1. The LTE system is a mobile communication system that has evolved from a UMTS system. FIG. 1 is a conceptual diagram illustrating an LTE system. Referring to FIG. 1, the LTE system can be generally classified into an Evolved UMTS (E-UTRAN) and an Evolved Packet Core (EPC). The E-UTRAN includes a UE and an Evolved Node-B (eNB). An interface between a UE and an eNB is referred to as a Uu interface, and an interface between eNBs is referred to as an X2 interface. The EPC may include a mobility management entity (MME) and a serving gateway (S-GW). An interface between an eNB and an MME is referred to as an S1-MME interface, and an interface between an eNB and an S-GW is referred to as an S-U interface, and a generic term for the two interfaces may also be called an S1 interface.

Figure 2:
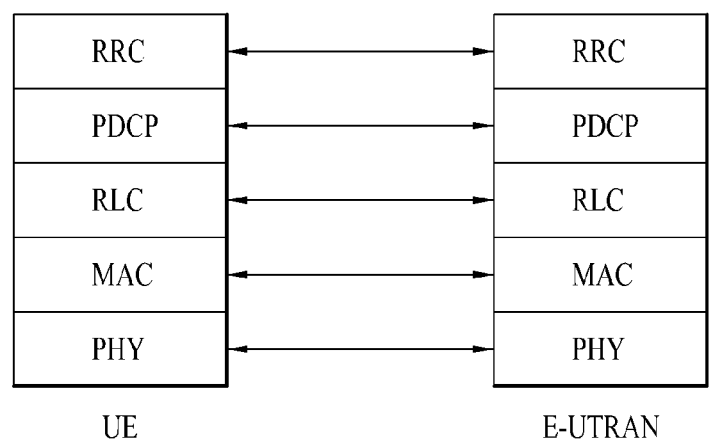
FIG. 2 is a diagram illustrating a control plane of a radio protocol.
Figure 3:
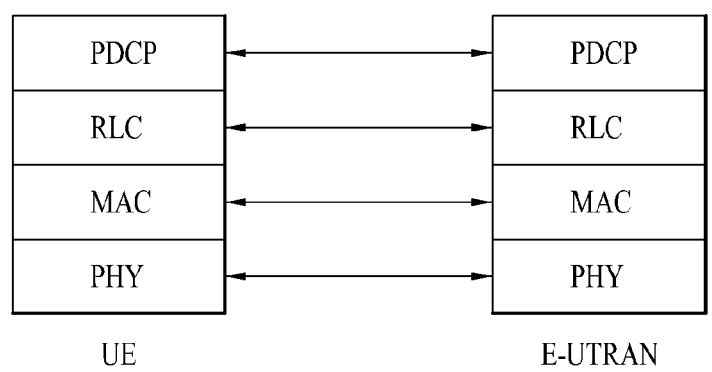
FIG. 3 is a diagram illustrating a user plane of a radio protocol.

A radio interface protocol is defined in the Uu interface which is a radio section, wherein the radio interface protocol is horizontally comprised of a physical layer, a data link layer, a network layer, and vertically classified into a user plane for user data transmission and a control plane for signaling (control signal) transfer. Such a radio interface protocol can be typically classified into L1 (first layer) including a PHY layer which is a physical layer, L2 (second layer) including MAC/RLC/PDCP layers, and L3 (third layer) including an RRC layer as illustrated in FIGS. 2 and 3, based on the three lower layers of an Open System Interconnection (OSI) reference model widely known in the field of communication systems. Those layers exist as a pair in the UE and E-UTRAN, thereby performing data transmission of the Uu interface.

Each layer of a radio protocol shown in FIGS. 2 and 3 is described. FIGS. 2 and 3 are views illustrating the control plane and user plane architecture of the radio protocol, respectively.

A physical (PHY) layer serving as the first layer (L1) transmits an information transfer service to a higher layer over a physical channel. The physical (PHY) layer is connected to a Medium Access Control (MAC) layer serving as a higher layer over a transport channel. Through the transport channel, data is transferred from the MAC layer to the physical layer or is also transferred from the physical layer to the MAC layer. In this case, the transport channel is largely classified into a dedicated transport channel and a common transport channel depending on whether or not the channel is shared. In addition, data is transferred between different PHY layers (i.e., between a PHY layer of a transmitter and a PHY layer of a receiver) over a physical channel using radio resources.

A variety of layers exist in the second layer (L2). The MAC layer maps various logical channels to various transport channels and performs logical channel multiplexing to map a plurality of logical channels to one transport channel. The MAC layer is connected to the RLC layer, which is a higher layer, through a logical channel. The logical channel is divided into a control channel for transmitting information on a control plane and a traffic channel for transmitting information on a user plane, according to the kind of transmitted information.

The radio link control (RLC) layer of the L2 layer segments and concatenates data received from a higher layer, such that it controls a data size to suit radio data transmission at a lower layer. For controlling data size, the RLC layer segments or concatenates data received from a higher layer. To support various QoS levels requisite for various radio bearers (RBs), the RLC layer provides three RLC modes, Transparent Mode (TM), Unacknowledged Mode (UM), and Acknowledged Mode (AM). Specifically, an AM RLC performs a retransmission function using an Automatic Repeat and Request (ARQ) function so as to implement reliable data transmission.

The packet data convergence protocol (PDCP) layer of the L2 layer enables efficient data transmission in IP packets such as IP version 4 (IPv4) or IP version 6 (IPv6) packets on a radio link having a relatively narrow bandwidth. For this purpose, the PDCP layer performs header compression to reduce the size of an IP packet header including relatively large and unnecessary control information. Since only necessary information is transmitted in the data header through header compression, the transmission efficiency of the radio link is increased. In addition, in the LTE system, the PDCP layer performs a security function, this security function is composed of a ciphering function (also called an encryption function) for preventing a third party from eavesdropping on data and an integrity protection function for preventing a third party from fraudulently handling data.

Referring to FIG. 2, the Radio Resource Control (RRC) layer located at the top of the third layer (L3) is defined only in the control plane and is responsible for control of logical, transport, and physical channels in association with configuration, reconfiguration and release of Radio Bearers (RBs). The RB is a logical path that the first and second layers (L1 and L2) provide for data communication between the UE and the UTRAN. Generally, Radio Bearer (RB) configuration means that a radio protocol layer needed for providing a specific service, and channel characteristics are defined and detailed parameters and operation methods thereof are configured. The Radio Bearer (RB) is classified into a Signaling RB (SRB) and a Data RB (DRB). The SRB is used as a transmission passage of RRC messages in the control plane, and the DRB is used as a transmission passage of user data in the user plane.

In addition, a Non-Access Stratum (NAS) layer (not shown) located above the RRC layer is defined in a control plane between an MME and a UE. The NAS layer mainly performs a function for supporting UE mobility and a session management function for establishing/maintaining IP connection of a UE, and the like.

As described above, the MAC layer is connected to the RLC layer through a logical channel. The logical channel is generally classified into a control logical channel and a traffic logical channel. The control logical channels provided by the MAC layer may include a Broadcast Control Channel (BCCH), a Paging Control Channel (PCCH), a Common Control Channel (CCCH), a Dedicated Control Channel (DCCH), etc. The traffic logical channel may include a dedicated traffic channel (DTCH), etc.

In addition, the MAC layer is connected to the PHY layer through a transport channel. The downlink transport channel is associated with data transmitted from a network to a UE. The downlink transport channel may include a broadcast channel (BCH) for transmitting system information, a paging channel (PCH) for transmitting a paging message, a Downlink-Shared Channel (DL-SCH) for transmitting a user traffic or a control message, a multicast channel (MCH) for transmitting a traffic or control message of a downlink multicast or a broadcast service (i.e., MBMS), and the like. The uplink transport channel is associated with data transmitted from the UE to the network. The uplink transport channel may include a Random Access Channel (RACH) for transmitting an initial control message, a Uplink-Shared Channel (UL-SCH) for transmitting a user traffic or a control message, etc.

The mapping relationship between the logical channel and the transport channel is shown in Tables 1 and 2. Table 1 shows uplink channel mapping, and Table 2 shows downlink channel mapping.

TABLE 1

| Logical channel | Transport channel | |
|---|---|---|
| | UL-SCH | RACH |
| CCCH | X | |
| DCCH | X | |
| DTCH | X | |

TABLE 2

| Logical channel | Transport channel | | |
|---|---|---|---|
| | BCH | PCH | DL-SCH |
| BCCH | X | | X |
| PCCH | | X | |
| CCCH | | | X |
| DCCH | | | X |
| DTCH | | | X |

In case of uplink, a transport channel (UL-SCH) is mapped to a logical channel (CCCH, DCCH, or DTCH) as shown in Table 1. In case of downlink, a transport channel (BCCH) is mapped to transport channels (BCH and DL-SCH) as shown in Table 2. In addition, a logical channel (PCCH) is mapped to a transport channel (PCH), and logical channels (CCCH, DCCH, DTCH) are mapped to the transport channel (DL-SCH).

The mapping relationship between the transport channel and the physical channel is shown in Tables 3 and 4. Table 3 shows uplink channel mapping, and Table 4 shows downlink channel mapping.

TABLE 3

| TrCH | Physical Channel |
|---|---|
| UL-SCH | PUSCH |
| RACH | PRACH |

TABLE 4

| TrCH | Physical Channel |
|---|---|
| DL-SCH | PDSCH |
| BCH | PBCH |
| PCH | PDSCH |
| MCH | PMCH |

In case of uplink, a transport channel (UL-SCH) is mapped to a Physical Uplink Shared Channel (PUSCH) acting as a physical channel as shown in Table 3, and a transport channel (RACH) is mapped to a physical random access channel (PRACH) acting as a physical channel. In case of downlink, as shown in Table 4, a transport channel (DL-SCH) is mapped to a physical downlink shared channel (PDSCH) acting as a physical channel, a transport channel (BCH) is mapped to a physical broadcast channel (PBCH) acting as a physical channel, a transport channel (PCH) is mapped to a physical channel (PDSCH), and a transport channel (MCH) is mapped to a physical multicast channel (PMCH) acting as a physical channel.

A physical channel may be located in a resource region defined not only by a predetermined unit of a time domain but also by a predetermined unit of a frequency domain. The predetermined unit of the time domain may correspond to a radio frame, a subframe, a slot or a symbol. For example, one radio frame includes 10 subframes, and one subframe includes two slots, and one slot includes 7 symbols (e.g., 7 OFDM symbols) in case of a normal cyclic prefix (CP). The frequency unit of the frequency domain may correspond to a subcarrier. The resource block defined in terms of a time-frequency domain is defined not only by a plurality of symbols of the time domain but also by a plurality of subcarriers of the frequency domain. For example, one resource block may correspond to a resource region defined by 7 OFDM symbols and 12 subcarriers.

Figure 4:
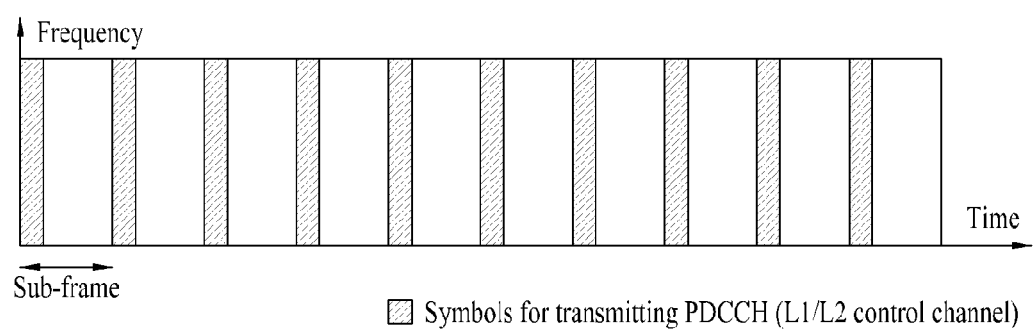
FIG. 4 exemplarily shows the position of a PDCCH in one radio frame.

In addition, a physical downlink control channel (PDCCH) may be used to transmit downlink L1/L2 control information. PDCCH may be defined in first N symbols (for example, $1 \leq N \leq 4$) of a single subframe. FIG. 4 exemplarily shows the position of a PDCCH in one radio frame. In FIG. 4, each of two slots contained in one subframe is 0.5 ms long, and a Transmission Time Interval (TTI) acting as a unit time of data transmission is 1 ms long, and one radio frame may be 10 ms long. However, the frame structure shown in FIG. 4 is disclosed only for illustrative purposes, and the scope or spirit of the present invention is not limited thereto.

Carrier Aggregation (CA)

Figure 5:
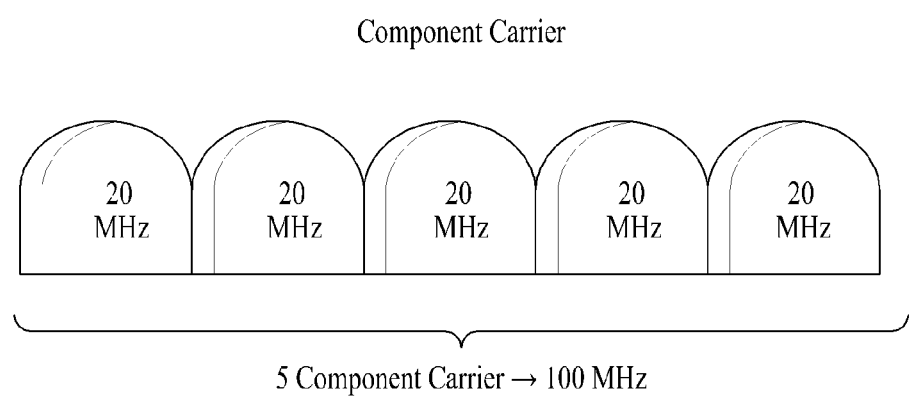
FIG. 5 is a diagram illustrating carrier aggregation (CA).

Carrier aggregation (CA) technology supporting multiple carriers will hereinafter be described with reference to FIG. 5. Carrier aggregation can support a system bandwidth up to a maximum of 100 MHz by grouping a maximum of 5 carriers (5 Component Carriers; 5 CCs) of a bandwidth unit (e.g., 1.25 MHz, 2.5 MHz, 5 MHz, 10 MHz, or 20 MHz) defined in a legacy wireless communication system (e.g., an LTE system). The bandwidth sizes of CCs used for carrier aggregation may be the same or different. Individual CCs have different frequency bands (or central frequencies). Although individual CCs used for carrier aggregation may be present on contiguous frequency bands, other CCs present in discontinuous frequency bands may also be used for carrier aggregation. In the carrier aggregation technology, bandwidth sizes of UL and DL may be symmetrically or asymmetrically allocated. In the LTE-A system, the serving cell may be composed of a single downlink CC and a single uplink CC, or may also be composed of a single downlink CC. However, the scope or spirit of the present invention is not limited thereto, and one cell for use in the evolved or other wireless communication system may be independently configured only in uplink resources.

In case of carrier aggregation technology, one RRC connection is present between a UE and an eNode B. A plurality of serving cells configured to be used by the UE is classified into PCell and SCell. PCell may correspond to a serving cell for providing not only a security input (for example, E-UTAN Cell Global Identifier (ECGI), Physical Cell Identifier (PCI), Absolute Radio-Frequency Channel Number (ARFCN)) to perform establishment or re-establishment of RRC connection, but also mobility information (for example, tracking area identity (TAI)) of the NAS layer. SCell may correspond to cells other than PCell.

In case of constructing a plurality of serving cells, SCell can be added or released by the eNode B as necessary whereas PCell can always be used. After SCell has been added by the eNode B, the SCell can be dynamically used according to an activation or deactivation state.

Multimedia Broadcast and Multicast Service (MBMS)

MBMS is a point-to-multipoint (p-t-m) transmission method which enables a plurality of UEs within the corresponding cell to simultaneously receive the same packet using only one transmission action of the eNode B within one cell. The LTE system based on the OFDMA transmission scheme has defined a multi-cell transmission scheme acting as a broadcast transmission scheme in which a plurality of eNode Bs simultaneously transmits the same packet.

The LTE system defines an MBSFN (MBMS Single Frequency Network) synchronization area (or MBSFN synchronous region) in which synchronization transmission is available for the multi-cell transmission service. Synchronization transmission of cells contained in the MBSFN synchronous region is possible, and inter-cell interference and diversity gain can be obtained through synchronization transmission. One cell belongs to one MBSFN synchronous region. A plurality of MBSFN regions (for example, 256 MBSFN regions) may be present in the MBSFN synchronous region. The same radio resource region is allocated for MBSFN to cells contained in the MBSFN region, and the corresponding cells have broadcast channel information. A plurality of MCHs (for example, a maximum of 16 MCHs) transmitted using the same coding method may be present in one MBSFN region. A service for providing a plurality of broadcast contents (for example, a maximum of 30 broadcast contents) can be provided through one MCH.

Figure 6:
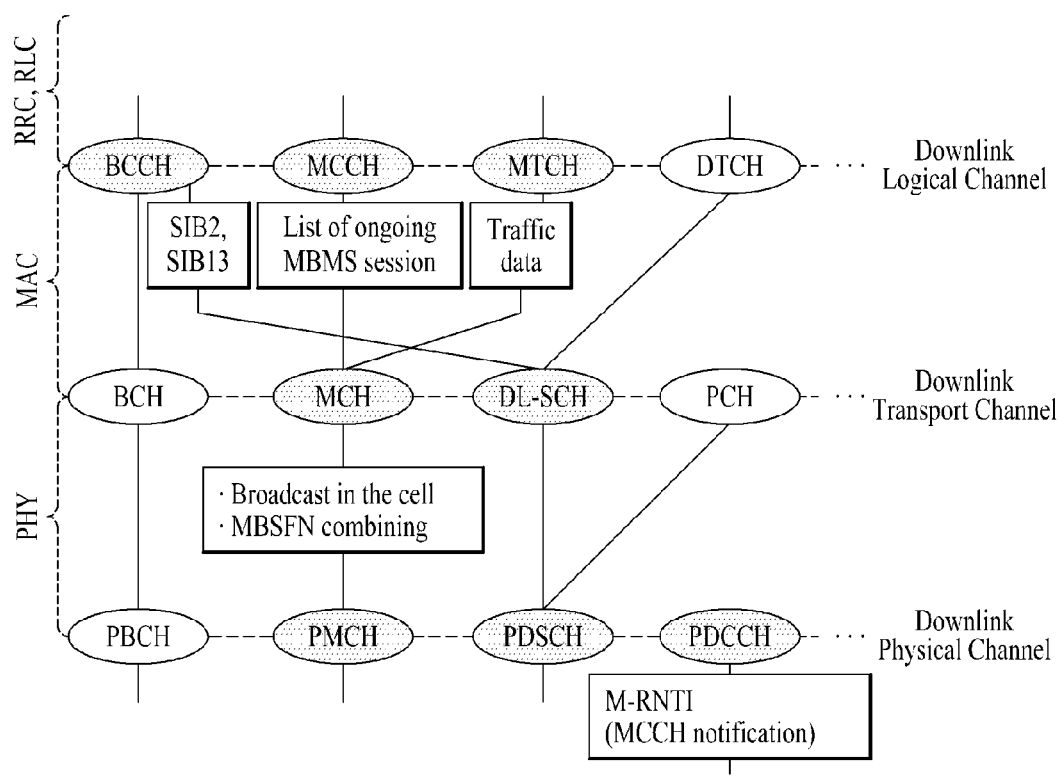
FIG. 6 is a diagram illustrating an MBMS channel structure.

FIG. 6 is a diagram illustrating an MBMS channel structure.

A logical channel (BCCH) can provide system information through various types of system information blocks (SIBs). In association with MBMS, SIB Type 2 (SIB2) may include configuration information regarding subframe allocated for MBSFN. In addition, SIB13 may include information (for example, MCCH position information) necessary for obtaining MBMS control information. While a master information block (MIB) from among information transferred through a logical channel (BCCH) is provided to the UE over a transport channel (BCG) and a physical channel (PBCH), SIB (for example, SIB2 or SIB13) can be provided to the UE over a transport channel (DL-SCH) and a physical channel (PDSCH).

MCCH is a logical channel for transmitting MBMS control information (for example, MBSFN area information, information regarding current ongoing MBMS sessions, etc.) and the like. MTCH is a logical channel for transmitting MBMS user traffic data. MBMS control information may correspond to an MBMS-related RRC message. Each MBSFN region for transmitting the same MBMS information/traffic includes one MCCH channel. If one cell provides a plurality of MBSFN regions, the UE may also receive a plurality of MCCHs.

A logical channel (MCCH) and/or another logical channel (MTCH) may be mapped to a transport channel (MCH). MCH is based on the point-to-multipoint (p-t-m) transmission scheme, is broadcast within a cell, and is used as a transport channel of the MBSFN subframe. Allocation of a subframe used for MBSFN may be semi-statically achieved in MBMS Coordination Entity (MCE). A transport channel (MCH) may be mapped to a physical channel (PMCH).

Assuming that the new MBMS is added, MBMS-Radio Network Temporary Identifier (M-RNTI) may be used by PDCCH so as to inform an idle-state UE of new MBMS addition. For example, if an MBMS-related RRC message is changed in a specific MCCH channel, an indicator indicating a specific MCCH and an M-RNTI can be transmitted through a PDCCH. The UE supporting the MBMS receives an M-RNTI indicator and an MCCH indicator through the PDCCH, such that it can recognize the change of MBMS-related RRC message in a specific MCCH, and can receive the specific MCCH. The RRC message of MCCH can be changed every change period, and can repeatedly broadcast every repetition period (RP).

Table 5 shows detailed description of MBMS-related channels from among channels shown in FIG. 6.

TABLE 5

| Logical Channel | BCCH | SIB2: MCH subframe allocation information |
| | | SIB13: MCCH position information, etc. |
| | MTCH | Data traffic information is transmitted to UE. |
| | MCCH | MBSFN region information is transmitted every MCCH RP. |
| | | MTCH channel information (information of activated service) is transmitted. |
| Transport Channel | MCH | MCCH and MTCH transmission. |
| | | P-t-M transmission. |
| | | Cell broadcast |
| Physical Channel | PMCH | MCH is transmitted in MBSFN subframe |
| | PDCCH | Service start indication (M-RNTI) |

In addition, the UE may receive a dedicated service during the MBMS reception. For example, a certain user can view a TV program using his or her smartphone, and at the same time can chat with other users through instant messaging (IM) such as MSN or Skype using the smartphone. In this case, TV viewing may correspond to an MBMS that enables a plurality of UEs can simultaneously receive data, and the IM service may correspond to a dedicated service separately provided to each UE (here, the MBMS may correspond to a multicast/broadcast service, and the dedicated service may correspond to a unicast service). The MBMS is provided through an MTCH, and the dedicated service is provided through a dedicated bearer such as DCCH or DTCH. In this case, the bearer may indicate a logical/virtual connection for providing a service having a predetermined quality (QoS), and the dedicated bearer may indicate a bearer for a dedicated service for each UE.

It is assumed that a certain eNode B provides the MBMS and the dedicated service. It is also assumed that the eNode B can simultaneously use a plurality of frequencies within one region. Here, the frequency may be a frequency (i.e., MBMS frequency) corresponding to a unit used for MBMS. In order to efficiently utilize radio resources, the eNode B can provide the MBMS at only one frequency selected from among a plurality of frequencies, and can provide each UE with a dedicated bearer at all frequencies. That is, both the MBMS and the dedicated service can be provided at a frequency selected for MBMS.

If the UE having received the service using the dedicated bearer at a frequency not providing the MBMS desires to receive the MBMS, the UE needs to be handed over to a frequency providing the MBMS. For this purpose, the UE can transmit an MBMS interest indication message to the eNode B. In other words, if the UE desires to receive the MBMS, the UE transmits the MBMS interest indication message to the eNode B. If the eNode B supporting the MBMS receives the MBMS interest indication message, this means that the UE desires to receive the MBMS, so that the UE can be shifted to or handed over to a frequency providing the MBMS.

In this case, the MBMS interest indication message indicates that the UE desires to receive the MBMS. In addition, the MBMS interest indication message may include information regarding a target frequency desired by the UE. That is, the MBMS interest indication message is used to indicate that the UE is receiving the MBMS or the UE is going to receive (or is interested to receive) the MBMS. The MBMS interest indication message may further include MBMS frequency information used for transmission of the MBMS that is currently received by the UE or is going to be received by the UE.

Improved MBMS Operation Scheme

The user equipment (UE) for use in a mobile communication system has mobility. That is, the UE does not stay in one place, and the UE position may be changed according to time. Although the cell including the UE is changed due to the UE mobility, it is necessary to provide a seamless MBMS. Alternatively, although a frequency used by the UE is changed when the UE stays in the same position, it is necessary to provide a seamless MBMS. In various cases such as an exemplary case in which a frequency or cell used by the UE is changed, if the UE can continuously receive the MBMS, this situation means the MBMS continuity function.

If the MBMS is supported in all regions and all frequencies, it is not difficult to provide the MBMS continuity. However, the MBMS may not be provided in all regions or all frequencies. For example, the MBMS may not be provided in a specific region, or a specific service from among a variety of MBMSs may not be provided at a frequency.

Figure 7:
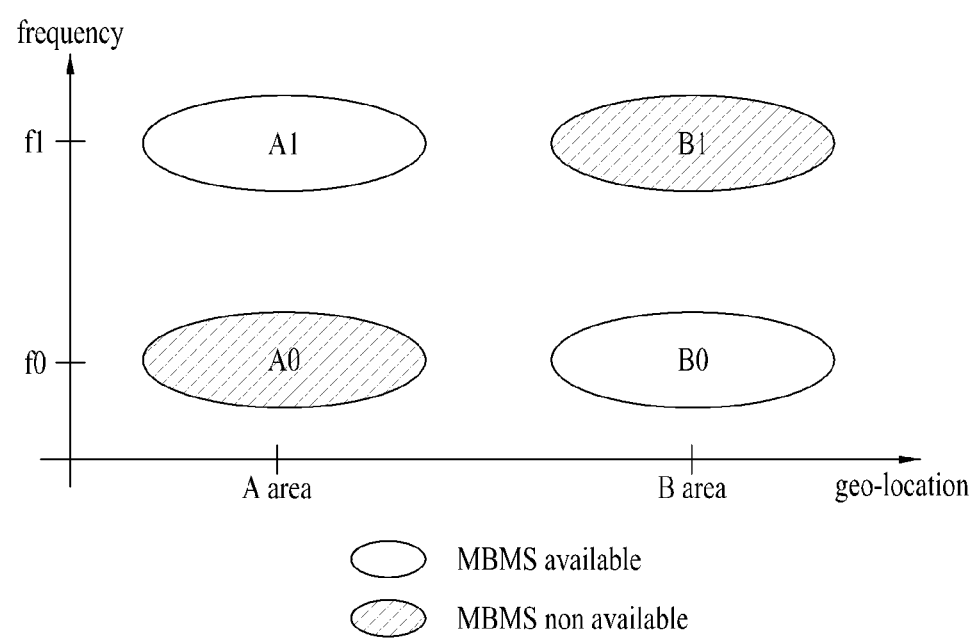
FIG. 7 shows an exemplary scenario of an MBMS.

FIG. 7 shows an exemplary scenario of an MBMS. In the example of FIG. 7, the MBMS may not be provided to a frequency band of a frequency (f0), and the MBMS may not be provided to the frequency band of (f1) (here, f0 and f1 may be distinguished from each other in terms of MBMS provision). That is, MBMS may be available to the cell A0 whereas MBMS may not be available to the cell A1. In this case, Cell A0 and Cell A1 may correspond to different eNode Bs, or may correspond to a plurality of cells of a single eNode B in terms of carrier aggregation. In contrast, whereas the MBMS is provided in the f0 frequency band of the B region, the f1 frequency band may not provide the MBMS. Cell B0 and Cell B1 may belong to different eNode Bs, or may correspond to a plurality of cells in terms of carrier aggregation. In this case, an MBMS available or unavailable state in a specific cell may indicate an available or unavailable state of the MBMS, or may indicate that a specific MBMS (for example, some TV broadcast programs from among a plurality of TV broadcast programs) is available or unavailable.

In FIG. 7, it is assumed that a certain UE receives the MBMS within the cell A1. Provided that the corresponding UE maintains the same frequency and at the same time moves from the A region to B region, or provided that the frequency is changed from f1 to f0 although the geographic location is not changed, the UE belongs to a cell for providing no MBMS. In this case, it is impossible to provide the UE with the MBMS continuity.

Provided that the UE contained in Cell A0 or Cell B1 desires to receive the MBMS as shown in FIG. 7, the UE transmits the MBMS interest indication message to the eNode B. From the viewpoint of the UE, although the eNode B supporting no MBMS receives the MBMS interest indication message from the UE, it is impossible for the eNode B to provide the MBMS. In this case, if the UE does not receive a response to the MBMS interest indication message from the eNode B, it is difficult to recognize how to operate the UE. In some cases, a waste of radio resources may occur in the UE or the faulty operation may also occur in the UE. Although an eNode B supporting no MBMS receives the MBMS interest indication message, it is difficult to recognize how to operate the eNode B, and the faulty operation and a waste of radio resources may occur in the eNode B. Therefore, there is a need for the UE and the eNode B to correctly and efficiently perform the transmission/reception operations of the MBMS interest indication message.

Embodiment 1

A first embodiment (Embodiment 1) relates to a method for enabling the UE to transmit the MBMS interest indication message to the eNode B. In more detail, the eNode B can provide information as to whether the UE transmits the MBMS interest indication message to the UE.

For example, information as to the MBMS interest indication transmission is allowed can be defined as the following various information types (i) to (v). Information (i) directly or indirectly indicates whether transmission of the MBMS interest indication message of the UE is allowed. Information (ii) indicates a specific time or condition in which transmission of the MBMS interest indication message of the UE is allowed. Information (iii) indicates whether transmission of the MBMS interest indication message of the UE is requested. Information (iv) indicates whether the eNode B supports the function related to transmission of the MBMS interest indication message. Information (v) indicates whether the eNode B supports the MBMS continuity function. The above-mentioned exemplary information i) to v) may be used independently of each other, or one or more information pieces may be simultaneously used.

Therefore, if transmission of the MBMS interest indication message is allowed, if a specific condition is satisfied, if the eNode B requests transmission of the MBMS interest indication message, if the eNode B supports the MBMS interest indication associated function, and/or if the eNode B supports the MBMS continuity function, the UE can transmit the MBMS interest indication message to the eNode B.

In addition, although the UE desires to transmit the MBMS interest indication message to the network, if transmission of the MBMS interest indication message is not allowed, if a specific condition is not satisfied, if the eNode B does not request transmission of the MBMS interest indication message, if the eNode B does not support the MBMS interest indication associated function, and/or if the eNode B does not support the MBMS continuity function, the UE may not transmit the MBMS interest indication message to the eNode B.

In more detail, information indicating whether MBMS interest indication transmission is allowed can be provided to the UE through a system information block (SIB). That is, if the serving eNode B (or the serving cell) provides a predetermined SIB and the UE obtains the predetermined SIB of the current serving cell, the UE can indicate its own MBMS interest message.

The predetermined SIB may be defined as a new type SIB not defined yet, and may be referred to as SIB15 as an example. The new type SIB may include information related to MBMS reception considering UE mobility. The MBMS reception considering the UE mobility may indicate supporting the MBMS continuity to the UE that moves in the same MBSFN region. The scope of the present invention includes various schemes indicating whether transmission of the MBMS interest indication message for the UE is allowed through the new type SIB. For example, the scope of the present invention may include a scheme for explicitly including information indicating whether MBMS interest indication transmission is allowed in the new type SIB, and a scheme for allowing transmission of the MBMS interest indication message if the UE obtains the new type SIB.

In addition, information as to whether transmission of the MBMS interest indication message is allowed may be provided to the UE using the RRC message. That is, only when the MBMS interest indication transmission is allowed through the RRC message is indicated/established, the UE can indicate its own MBMS interest.

In addition, the eNode B can transmit a variety of information to the UE using the RRC message and/or the SIB, for example, information as to whether the eNode B supports the function related to the MBMS interest indication transmission of the UE, and information as to whether the eNode B supports the function related to MBMS continuity.

The above-mentioned principles of the present invention can also be used as a method for providing specific information as to whether an eNode B of a target cell allows transmission of the MBMS interest indication message of the UE even when the UE is handed over from a current serving cell (i.e., a source cell) to the target cell.

For example, if the UE is handed over from a currently connected eNode B (i.e., a source cell) to a new cell (i.e., a target cell), it is impossible for the UE to recognize whether transmission of the MBMS interest indication message is allowed in the new cell, such that it is possible to receive and read SIB of the new cell before updating the MBMS interest. For example, in the same manner as in the case in which the UE is handed over from Cell A0 to Cell B0 of FIG. 7, if the source cell does not provide the new type SIB and the target cell provides the new type SIB (i.e., information as to whether transmission of the MBMS interest indication message is allowed), the UE can indicate its own MBMS interest after performing a handover. That is, if the new type SIB (i.e., SIB related to allowance or rejection of MBMS interest indication transmission) is contained in an SIB provided by a new cell after completion of a UE handover, and if the UE obtains the corresponding SIB, the UE can indicate its own MBMS interest in a new cell.

In addition, the above-mentioned examples of the present invention can also be equally applied to another case in which the target cell provides specific information indicating whether the MBMS interest indication transmission is allowed through the RRC message.

In addition, if the UE receives a handover (HO command from the source cell, and if the HO command includes indication information for commanding the UE to transmit the MBMS interest indication message in a new cell, the UE enters a new target cell instead of the source cell and then transmits the MBMS interest indication message to the target cell.

Embodiment 2

In accordance with a second embodiment (Embodiment 2), the eNode B can request information related to transmission of the UE's MBMS interest indication message from the UE, and/or the UE can provide the above information to the eNode B.

For example, information related to the MBMS interest indication transmission may be information of MBMS-related priority. The eNode B can transmit a message (for example, RRC message) requesting the MBMS priority information to the UE. In this case, information as to what information to be obtained from the UE by the eNode B is can be contained in the request message. In addition, the UE may transmit a message (for example, the MBMS interest indication message or other RRC message) including MBMS priority information to the eNode B. The above-mentioned message may be a response to the request message of the eNode B, or may be transmitted from the UE without receiving a request from the eNode B.

In this case, the MBMS priority information may include the following various types of information (i) to (vi). Information (i) indicates whether the UE desires to receive the MBMS. Information (ii) indicates whether the UE receives the current MBMS. Information (iii) indicates whether the UE has priority over the MBMS or has priority over the unicast service. Information (iv) indicates whether the UE will accommodate a Quality of Service (QoS) lower than a QoS established in a unicast service (or a dedicated bearer for transmitting data of the unicast server). Information (v) indicates which of a Guaranteed Bit Rate (GBR) service and an MBMS is more preferred by the UE. Information (vi) indicates whether the UE wants to continuously receive a seamless unicast service. The above-mentioned information (i) to (vi) may be used independently of each other, or one or more information may be simultaneously used.

For example, the UE may transmit the MBMS interest indication message including information regarding one or more MBMS frequencies at which an MBMS session currently received by the UE or desired to be received by the UE is transmitted, to the eNode B. The MBMS interest indication message may include specific information indicating whether reception at the MBMS frequency indicated by the UE has priority over reception at the unicast bearer or vice versa (that is, reception at the unicast bearer has priority over reception at the MBMS frequency indicated by the UE).

Embodiment 3

A third embodiment (Embodiment 3) relates to a method for including information regarding the neighbor cell in the MBMS interest indication message.

As described above, the MBMS interest indication message may include information regarding the MBMS frequency at which the MBMS session being received by the UE is transmitted, or may include information regarding the MBMS frequency at which the MBMS session desired to be received by the UE is transmitted.

If the UE having an RRC_connected state and an MBMS capability transmits the above MBMS interest indication message, the above message may correspond to a message for preventing the UE from moving to another MBMS frequency from the viewpoint of a cell providing the MBMS, and the above message may correspond to a message for requesting shifting to another frequency providing the MBMS from the viewpoint of the cell providing no MBMS. In the latter case, if shifting to another frequency requested by the UE is allowed, the overall system throughput may be deteriorated. For example, if cells on the frequency shifting-requested by the UE do not satisfy a predetermined quality, the UE shifted to the corresponding frequency does not correctly communicate with the eNode B, so that poor connection between the UE and the eNode B may occur or a radio link failure may also occur.

In the third embodiment (Embodiment 3), in order to prevent the above-mentioned problems, when transmitting the MBMS interest indication message to the eNode B, the UE may further transmit the measurement result of neighbor cells. In this case, the measurement result may include information such as the signal strength of the corresponding cell. The measurement result may be contained in the MBMS interest indication message. Although the measurement result is transmitted through a separate message, the measurement result may be transmitted in connection with (or simultaneously with) the MBMS interest indication message. For example, the UE can transmit only the measurement result of cells present at a desired MBMS frequency to the eNode B, instead of reporting the measurement result of all the neighbor cells.

As an additional example, when the UE transmits the MBMS interest indication message including MBMS frequency information to the eNode B, the UE may further transmit information regarding a cell satisfying a predetermined reference from among a plurality of cells present at the MBMS frequency. In this case, the predetermined reference may be established by the eNode B, or may correspond to a minimum quality reference as an example. Information regarding cell(s) satisfying the predetermined reference may be contained in the MBMS interest indication message, may be transmitted through a separate message, and/or may be transmitted in relation with (simultaneously with) the MBMS interest indication message.

In addition, information indicating the presence or absence of the cell satisfying the predetermined reference may be used as a condition for transmitting the MBMS interest indication message. For example, if the UE takes interest in reception of the MBMS provided at a second frequency different from the first frequency used as the current frequency, the UE measures the second frequency. Only when the cell satisfying a predetermined quality reference at the second frequency is found, the UE can transmit the MBMS interest indication message to the eNode B.

Figure 8:
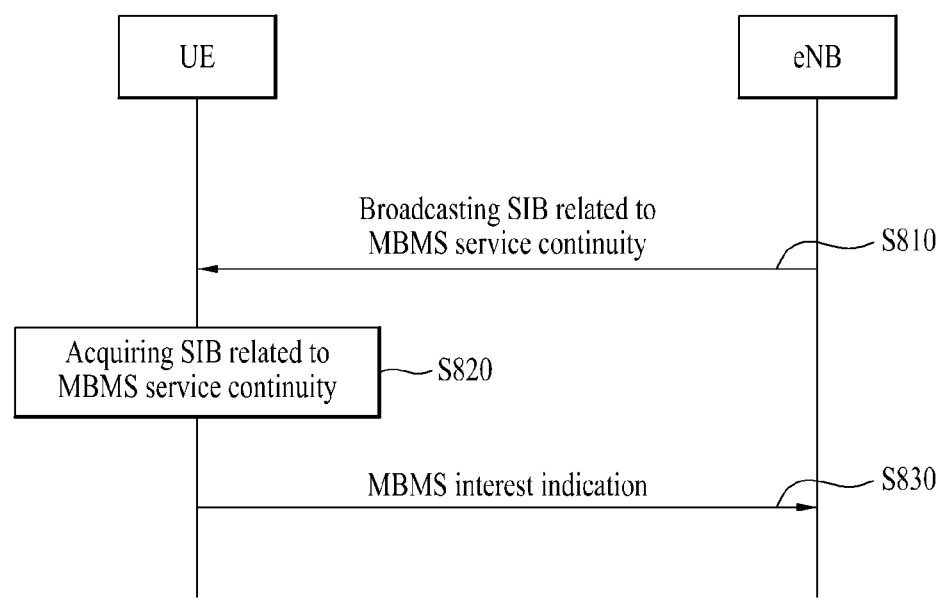
FIG. 8 is a flowchart illustrating a method for transmitting an MBMS interest indication message according to one embodiment of the present invention.

FIG. 8 is a flowchart illustrating a method for transmitting an MBMS interest indication message according to one embodiment of the present invention.

Referring to FIG. 8, the eNode B can transmit information indicating whether transmission of the MBMS interest indication message is allowed to the UE in step S810. For example, information indicating whether the MBMS interest indication transmission is allowed may correspond to a predetermined system information block (SIB) broadcast to a plurality of UEs contained in the cell. The predetermined SIB may include information related to the MBMS continuity.

In step S820, the UE can obtain information indicating whether MBMS interest indication transmission is allowed. For example, if the predetermined SIB is broadcast by the eNode B, the UE can obtain the predetermined SIB over a PDSCH.

The UE can transmit the MBMS interest indication message to the eNode B in step S830. Information indicating whether the step S830 is performed can be determined according to whether the UE has obtained allowance information of the MBMS interest indication transmission in step S820. That is, only when the UE has obtained the MBMS interest indication transmission allowance information (for example, the predetermined SIB), the UE can transmit the MBMS interest indication message to the eNode B.

In association with the above-mentioned operation for transmitting and receiving the MBMS interest indication message, the contents described in the above-mentioned embodiments may be used independently of each other or two or more embodiments may be simultaneously applied, and the same parts may be omitted herein for convenience and clarity of description.

Figure 9:
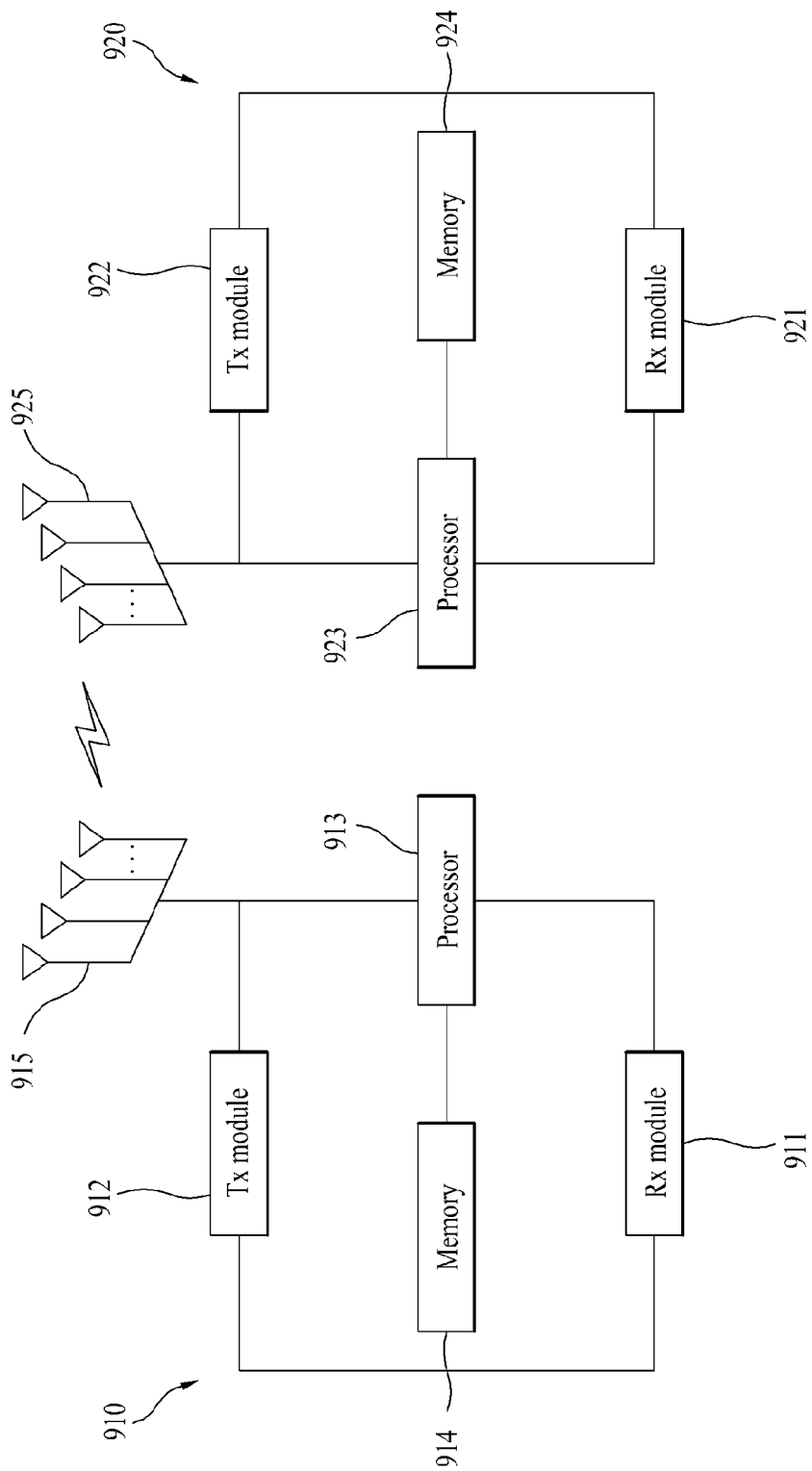
FIG. 9 is a block diagram illustrating an eNB apparatus and a UE apparatus according to embodiments of the present invention.

FIG. 9 is a block diagram illustrating an eNB apparatus 910 and a UE apparatus 920 according to embodiments of the present invention.

Referring to FIG. 9, an eNB apparatus 910 may include a reception (Rx) module 911, a transmission (Tx) module 912, a processor 913, a memory 914, and a plurality of antennas 915. The plurality of antennas 915 may be contained in the eNB apparatus supporting MIMO transmission and reception. The reception (Rx) module 911 may receive a variety of signals, data and information on uplink starting from the UE. The transmission (Tx) module 912 may transmit a variety of signals, data and information on downlink for the UE. The processor 913 may provide overall control to the eNB apparatus 910.

The eNB apparatus 910 according to one embodiment of the present invention is configured to provide the MBMS.

The processor 913 of the eNB apparatus 910 is configured to transmit information indicating allowance or rejection of MBMS interest indication transmission to the UE 920 through the transmission (Tx) module 912. For example, the information indicating allowance or rejection of the MBMS interest indication transmission may correspond to a predetermined SIB broadcast to a plurality of UEs contained in the cell. The predetermined SIB may include information related to the MBMS continuity.

In addition, the processor 913 is configured to receive the MBMS interest indication message from the UE through the reception (Rx) module 911. In this case, the MBMS interest indication message can be transmitted from the UE 920 only when the UE 920 obtains the MBMS interest indication transmission allowance information.

The processor 913 of the eNB apparatus 910 processes information received at the eNB apparatus 910 and transmission information. The memory 914 may store the processed information for a predetermined time. The memory 914 may be replaced with a component such as a buffer (not shown).

Referring to FIG. 9, a UE apparatus 920 may include a reception (Rx) module 921, a transmission (Tx) module 922, a processor 923, a memory 924, and a plurality of antennas 925. The plurality of antennas 925 may be contained in the UE apparatus supporting MIMO transmission and reception. The reception (Rx) module 921 may receive a variety of signals, data and information on downlink starting from the eNB. The transmission (Tx) module 922 may transmit a variety of signals, data and information on uplink for the eNB. The processor 923 may provide overall control to the UE apparatus 920.

The UE apparatus 920 according to one embodiment of the present invention is configured to receive the MBMS.

The processor 923 of the UE apparatus 920 is configured to obtain information indicating allowance or rejection of MBMS interest indication transmission from the eNode B 910 through the reception (Rx) module 921. For example, the information indicating allowance or rejection of the MBMS interest indication transmission may correspond to a predetermined SIB broadcast to a plurality of UEs contained in the cell. The predetermined SIB may include information related to the MBMS continuity.

In addition, the processor 923 is configured to obtain allowance information of MBMS interest indication transmission. In this case, the MBMS interest indication message can be transmitted to the eNode B 910 through the transmission (Tx) module 922 only when the processor 923 obtains the MBMS interest indication transmission allowance information.

The processor 923 of the UE apparatus 920 processes information received at the UE apparatus 920 and transmission information. The memory 924 may store the processed information for a predetermined time. The memory 924 may be replaced with a component such as a buffer (not shown).

The specific configurations of the above eNB and UE apparatuses may be implemented such that the various embodiments of the present invention are performed independently or two or more embodiments of the present invention are performed simultaneously. Redundant matters will not be described herein for clarity.

The eNB apparatus 910 shown in FIG. 9 may also be applied to different types of entities providing the MBMS, and the UE apparatus 920 shown in FIG. 9 may also be applied to different types of entities providing the MBMS.

The above-described embodiments of the present invention can be implemented by a variety of means, for example, hardware, firmware, software, or a combination of them.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

The embodiments of the present invention are applicable not only to the MBMS but also to a variety of mobile communication systems supporting other similar services. It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for receiving a multimedia broadcast multicast service (MBMS) by a user equipment (UE) in a wireless communication system, the method comprising:
   acquiring one or more system information blocks (SIBs) from a base station; and
   transmitting an MBMS interest indication message including MBMS priority information indicating that MBMS reception is prioritized above unicast reception, when a predetermined SIB related to MBMS service continuity is included in the one or more SIBs,
   wherein the transmitting of the MBMS interest indication message is allowed only when the predetermined SIB is acquired.

2. The method of claim 1, wherein the unicast reception is released, when the MBMS reception has been prioritized and the unicast reception cannot be supported because of congestion on an MBMS carrier.

3. The method of claim 1, wherein the UE is configured to simultaneously receive the MBMS and unicast service.

4. The method of claim 1, wherein the MBMS interest indication message includes information about whether the UE is receiving or interested to receive the MBMS via an MBMS single frequency network (MBSFN).

5. A method for transmitting a multimedia broadcast multicast service (MBMS) by a base station (BS) in a wireless communication system, the method comprising:
   transmitting one or more system information blocks (SIBs); and
   receiving an MBMS interest indication message including MBMS priority information indicating that MBMS reception is prioritized above unicast reception, when a predetermined SIB related to MBMS service continuity is included in the one or more SIBs,
   wherein the MBMS interest indication message is received only when the predetermined SIB is transmitted.

6. The method of claim 5, wherein the unicast reception is released, when the MBMS reception has been prioritized and the unicast reception cannot be supported because of congestion on an MBMS carrier.

7. The method of claim 5, wherein the BS is configured to simultaneously transmit the MBMS and unicast service.

8. The method of claim 5, wherein the MBMS interest indication message includes information about whether a user equipment (UE) is receiving or interested to receive the MBMS via an MBMS single frequency network (MBSFN).

9. A user equipment (UE) for receiving a multimedia broadcast multicast service (MBMS), the UE comprising:
   a processor configured to acquire one or more system information blocks (SIBs) from a base station; and
   a transmitter configured to transmit an MBMS interest indication message including MBMS priority information indicating that MBMS reception is prioritized above unicast reception, when a predetermined SIB related to MBMS service continuity is included in the one or more SIBs, wherein the transmitting of the MBMS interest indication message is allowed only when the predetermined SIB is acquired.

10. The UE of claim 9, wherein the unicast reception is released, when the MBMS reception has been prioritized and the unicast reception cannot be supported because of congestion on an MBMS carrier.

11. The UE of claim 9, wherein the MBMS interest indication message includes information about whether the UE is receiving or interested to receive an MBMS via an MBMS single frequency network (MBSFN).

12. A base station (BS) for transmitting a multimedia broadcast multicast service (MBMS), the BS comprising:

a transmitter configured to transmit one or more system information blocks (SIBs); and a receiver configured to receive an MBMS interest indication message including MBMS priority information indicating that MBMS reception is prioritized above unicast reception, when a predetermined SIB related to MBMS service continuity is included in the one or more SIBs, wherein the MBMS interest indication message is received only when the predetermined SIB is transmitted.

13. The BS of claim 12, wherein the unicast reception is released, when the MBMS reception has been prioritized and the unicast reception cannot be supported because of congestion on an MBMS carrier.

14. The BS of claim 12, wherein the MBMS interest indication message includes information about whether a user equipment (UE) is receiving or interested to receive the MBMS via an MBMS single frequency network (MBSFN).

* * * * *